(12) United States Patent
Yeung et al.

(10) Patent No.: US 10,015,113 B2
(45) Date of Patent: Jul. 3, 2018

(54) TECHNIQUES TO RESTORE MULTICAST DATA PLANE FROM PERSISTENT STORAGE

(71) Applicant: BROCADE COMMUNICATIONS SYSTEMS, INC., San Jose, CA (US)

(72) Inventors: Wing-Keung Adam Yeung, Saratoga, CA (US); Tejaswini Chadaga, San Jose, CA (US); Sabarivel Sakthivel, Santa Clara, CA (US)

(73) Assignee: BROCADE COMMUNICATIONS SYSTEMS LLC, San Jose, CA (US)

( * ) Notice: Subject to any disclaimer, the term of this patent is extended or adjusted under 35 U.S.C. 154(b) by 257 days.

(21) Appl. No.: 15/056,791

(22) Filed: Feb. 29, 2016

(65) Prior Publication Data

US 2016/0366070 A1  Dec. 15, 2016

Related U.S. Application Data

(60) Provisional application No. 62/173,281, filed on Jun. 9, 2015.

(51) Int. Cl.
*H04L 12/28* (2006.01)
*H04L 12/931* (2013.01)
*H04L 12/24* (2006.01)

(52) U.S. Cl.
CPC .......... *H04L 49/201* (2013.01); *H04L 41/084* (2013.01); *H04L 41/0856* (2013.01); *H04L 49/354* (2013.01)

(58) Field of Classification Search
CPC . H04L 49/201; H04L 49/354; H04L 41/0856; H04L 41/084; H04L 12/28
See application file for complete search history.

(56) References Cited

U.S. PATENT DOCUMENTS

| | | | | |
|---|---|---|---|---|
| 2003/0233594 A1* | 12/2003 | Earl | ................. | G06F 11/0709 714/4.11 |
| 2005/0223336 A1* | 10/2005 | Plow | ................. | G06F 3/0481 715/804 |
| 2006/0018333 A1* | 1/2006 | Windisch | ........... | H04L 12/1877 370/432 |
| 2008/0098100 A1* | 4/2008 | Zimmerman | .......... | H04L 67/06 709/222 |
| 2009/0180400 A1* | 7/2009 | Chiabaut | .............. | H04L 12/462 370/255 |
| 2011/0219093 A1* | 9/2011 | Ragunathan | ............ | G06F 15/16 709/207 |
| 2011/0228770 A1* | 9/2011 | Dholakia | .............. | H04L 45/586 370/390 |

(Continued)

*Primary Examiner* — Andrew Lee
(74) *Attorney, Agent, or Firm* — Shun Yao; Park, Vaughan, Fleming & Dowler LLP

(57) ABSTRACT

One embodiment of the present invention provides a switch. The switch includes a multicast management module, a storage module, and a recovery module. During operation, the multicast management module represents multicast information from one or more entries of a multicast data structure in a way that the switch can derive its multicast states from the multicast information. The storage module stores the multicast information in a recovery file in a local persistent storage device. If the switch reboots, the recovery module restores the multicast states of the switch from the multicast information in the recovery file.

20 Claims, 8 Drawing Sheets

(56) References Cited

U.S. PATENT DOCUMENTS

| | | | | |
|---|---|---|---|---|
| 2014/0369351 A1* | 12/2014 | Singh | .............. | H04L 49/9057 |
| | | | | 370/390 |
| 2015/0278039 A1* | 10/2015 | Bogdanov | ........... | G06F 11/2023 |
| | | | | 714/4.11 |
| 2016/0020915 A1* | 1/2016 | Anggawijaya | ........ | H04L 12/185 |
| | | | | 370/390 |
| 2016/0301724 A1* | 10/2016 | Kodaypak | ........... | H04L 43/0817 |

* cited by examiner

TECHNIQUES TO RESTORE MULTICAST DATA PLANE FROM PERSISTENT STORAGE

RELATED APPLICATION

This application claims the benefit of U.S. Provisional Application No. 62/173,281, titled "Method and System for Recovering Multicast Network from Cold Boot," by inventors Wing-Keung Adam Yeung, Tejaswini Chadaga, and Sabarivel Sakthivel, filed 9 Jun. 2015, the disclosure of which is incorporated by reference herein.

BACKGROUND

Field

The present disclosure relates to communication networks. More specifically, the present disclosure relates to a system and a method for fast multicast recovery for a rebooting switch.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as efficient multicast forwarding. However, the capabilities of a switch cannot grow infinitely. It is limited by physical space, power consumption, and design complexity, to name a few factors. Furthermore, switches with higher capability are usually more complex and expensive. As a result, increasing efficiency in existing capabilities of a switch adds significant value proposition.

Typically, a multicast protocol, such as protocol Independent Multicast (PIM), relies on the knowledge of the receivers, a data source, and a rendezvous point (RP) to operate. A switch running the multicast protocol usually processes join requests received from end devices to determine the receivers. The switch then uses join and prune messages to discover the data source, the RP, and outgoing interfaces. The switch uses such information to construct the multicast protocol states to participate in the multicast forwarding.

If the switch suffers an unplanned reboot (e.g., due to a power failure), the line cards of the switch can also lose their power supply. As a result, the switch goes through a complete power cycle, leading to a disruption in multicast forwarding. If this failure propagates to a plurality of switches (e.g., also to the backup switches), multicast data forwarding in the entire network can be disrupted. Under such circumstances, the convergence time for the multicast protocol is constrained by the time needed to rebuild the multicast protocol state. This rebuilding involves convergence of information associated with the receivers, the source, and the RP based on join and prune message processing. Furthermore, if the multicast protocol operates based on a unicast protocol (e.g., the routing protocol for the switch), this convergence time is in addition to the convergence time of unicast protocol. As a result, after the reboot, the switch can only resume its multicast forwarding after the convergence of both unicast and multicast protocols running on the switch.

While multicast forwarding brings many desirable features to a switch, some issues remain unsolved in facilitating fast recovery of the multicast states of a switch in the event of an unplanned reboot.

SUMMARY

One embodiment of the present invention provides a switch. The switch includes a multicast management module, a storage module, and a recovery module. During operation, the multicast management module represents multicast information from one or more entries of a multicast data structure in a way that the switch can derive its multicast states from the multicast information. The storage module stores the multicast information in a recovery file in a local persistent storage device. If the switch reboots, the recovery module restores the multicast states of the switch from the multicast information in the recovery file.

In a variation on this embodiment, representing the multicast information includes one or more of: serializing an outgoing interface tree (e.g., representing a list of outgoing interfaces) associated with a respective entry of the multicast data structure, and serializing virtual local area network (VLAN) information configured for a respective outgoing interface of the outgoing interface tree.

In a variation on this embodiment, the multicast data structure is a backup Multicast Cache (MCACHE). The one or more entries in the multicast data structure is selected by applying a filter applied to an MCACHE distinct from the backup MCACHE. It should be noted that the filter is for selecting a subset of the MCACHE entries. The switch may not apply the filter and store a respective MCACHE entry in the recovery file.

In a further variation, the filter is an access control list specifying one or more of: a range of multicast addresses, one or more rendezvous points (RPs), and one or more incoming interfaces.

In a further variation, the multicast management module maintains a backup MCACHE for a respective virtual routing and forwarding (VRF) of the global forwarding information of the switch.

In a variation on this embodiment, the storage module updates the recovery file in response to detecting a trigger event. The trigger event is based on one or more of: an update frequency and a detection of an update to the multicast states of the switch.

In a variation on this embodiment, restoring the multicast states of the switch includes one or more of: generating multicast forwarding entries in an MCACHE, populating an outgoing interface tree for a respective entry of the MCACHE, and loading multicast forwarding information into switch hardware.

In a further variation, restoring the multicast states of the switch further includes one or more of: initiating a timer for a respective outgoing interface of the outgoing interface tree and initiating a keep alive timer for multicast forwarding information in the switch hardware.

BRIEF DESCRIPTION OF THE FIGURES

In the figures, like reference numerals refer to the same figure elements.

DETAILED DESCRIPTION

Figure 1A:
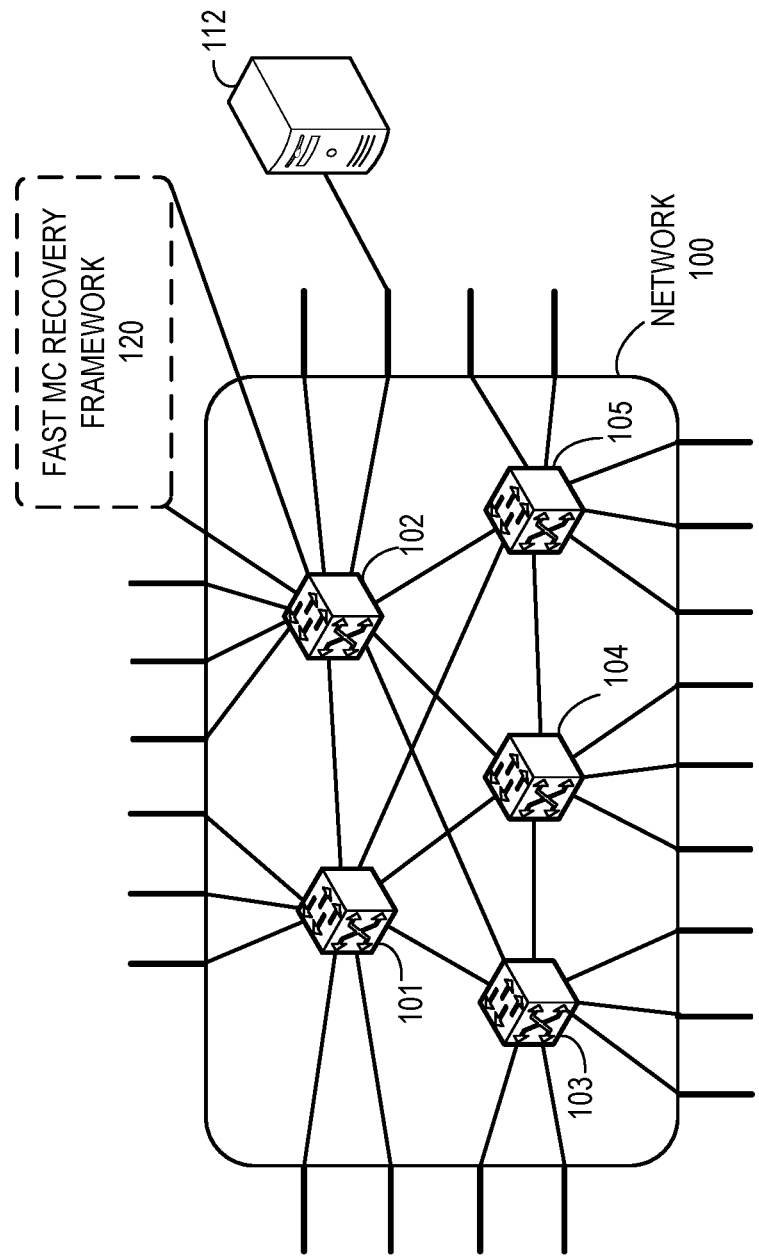
FIG. 1A illustrates an exemplary network with fast multicast recovery framework support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficient convergence of multicast states during an unplanned reboot of a switch is solved by storing the multicast soft state information of the switch in a persistent storage device. These states are restored when the switch reboots, thereby allowing the switch to readily start forwarding multicast packets. When the switch suffers an unplanned reboot (e.g., due to a power failure), the switch goes through a complete power cycle. As a result, the line cards of the switch cannot forward multicast traffic during the rebooting process. If other switches (e.g., the backup switches) simultaneously go through such unplanned reboot, multicast data forwarding in the entire network can be disrupted.

With existing technologies, to reduce the recovery time, a switch can use a static source and multicast group configuration. However, this approach requires statically provided prior knowledge of the sources and receivers. As a result, this approach reduces the flexibility of the multicast protocol and affects the dynamic nature of the multicast protocol. Another approach relies on an increased number of control messages for quickly detecting neighbors and topology changes. However, increasing the number of control messages leads to an increase of bandwidth consumption on the adjacent links. In addition, adjacent switches use a larger share of their processing capabilities (e.g., processor cycles) for processing the additional control messages.

To solve this problem, when a switch operates a multicast protocol and participates in a multicast tree, the switch stores the converged soft multicast states (e.g., the states maintained by the software of the switch) in a persistent storage device of the switch. When the protocol converges, the switch can retrieve its multicast states. The multicast states comprise PIM Multicast Cache (MCACHE) states, which include route information associated with the source and multicast group (i.e., the multicast routing states). The switch then obtain the soft states of a respective MCACHE entry, represents these states in an efficient representation, and stores the information in a recovery file in the persistent storage device (e.g., a flash memory card, a solid state drive, a hard drive, etc) of the switch.

In some embodiments, the switch can apply a filter (e.g., an access control list) to select a set of multicast groups for which the switch facilitates the fast multicast recovery. The switch then obtains the entries for the set of multicast groups from its MCACHE. The switch can update the recovery file in response to detecting a trigger event. Examples of a trigger event include, but are not limited to, a periodic check for update in the MCACHE and a detection of an update of an entry that is backed up in the recovery file. It should be noted that the filter is for selecting a subset of the MCACHE entries. If a switch is capable, the switch may not apply the filter and store a respective MCACHE entry in a recovery file.

If the switch reboots (e.g., due to a failure), the soft states of a respective multicast group are restored from the information in the recovery file. The switch determines the incoming and outgoing interfaces for the multicast group, generates the corresponding forwarding entries in the MCACHE, and loads the forwarding information in the switch modules (e.g., processing hardware of the switch, such as application-specific integrated circuit (ASIC) chips, and content addressable memory (CAM)). As a result, with a fully constructed multicast distribution tree pre-loaded, the switch can start forwarding traffic once the underlying unicast protocol converges.

In some embodiments, the switch can be a member switch of a network of interconnected switches (e.g., a fabric switch). In a fabric switch, any number of switches coupled in an arbitrary topology can be controlled as a single logical switch. The fabric switch can be an Ethernet fabric switch or a virtual cluster switch (VCS), which can operate as a single Ethernet switch. In some embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identifies the switch to be a member switch of the fabric switch.

In this disclosure, the term "fabric switch" refers to a number of interconnected physical switches which can form a single, scalable network of switches. The member switches of the fabric switch can operate as individual switches. The member switches of the fabric switch can also operate as a single logical switch in the provision and control plane, the data plane, or both. "Fabric switch" should not be interpreted as limiting embodiments of the present invention to a plurality of switches operating as a single, logical switch. In this disclosure, the terms "fabric switch" and "fabric" are used interchangeably.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end host" can refer to any device external to a network (e.g., does not perform forwarding in that network). Examples of an end host include, but are not limited to, a physical or virtual machine, a conventional layer-2 switch, a layer-3 router, or any other type of network device. Additionally, an end host can be coupled to other switches or hosts further away from a layer-2 or layer-3 network. An end host can also be an aggregation point for a number of network devices to enter the network. An end host hosting one or more virtual machines can be referred to as a host machine. In this disclosure, the terms "end host" and "host machine" are used interchangeably.

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. A link between inter-switch ports is referred to as an "inter-switch link." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary network with fast multicast recovery framework support, in accordance with an embodiment of the present invention. As illustrated in FIG. 1A, a network 100 includes switches 101, 102, 103, 104, and 105. An end device 112 is coupled to switch 102. In some embodiments, end device 112 is a host machine, hosting one or more virtual machines. End device 112 can include a hypervisor, which runs one or more virtual machines. End device 112 can be equipped with a network interface card (NIC) with one or more ports. End device 112 is coupled to switch 102 via the ports of the NIC.

In some further embodiments, network 100 is an IP network and a respective switch of network 100, such as switch 102, is an IP-capable switch, which calculates and maintains a local IP routing table (e.g., a routing information base or RIB), and is capable of forwarding packets based on its IP addresses. Under such a scenario, communication among the switches in network 100 is based on IP or IP-based tunneling. For example, upon receiving an Ethernet frame from end device 112, switch 102 encapsulates the received Ethernet frame in an IP header (and/or a tunneling header) and forwards the IP packet. Examples of a tunneling protocol include, but are not limited to, virtual extensible LAN (VXLAN), generic routing encapsulation (GRE), layer-2 tunneling protocol (L2TP), and multi-protocol label switching (MPLS).

In some embodiments, network 100 is a fabric switch (under such a scenario, network 100 can also be referred to as fabric switch 100). Fabric switch 100 is assigned with a fabric switch identifier (e.g., a fabric label). A respective member switch of fabric switch 100 is associated with that fabric switch identifier. This allows the member switch to indicate that it is a member of fabric switch 100. In some embodiments, whenever a new member switch joins fabric switch 100, the fabric switch identifier is associated with that new member switch. Furthermore, a respective member switch of fabric switch 100 is assigned a switch identifier (e.g., an RBridge identifier, a Fibre Channel (FC) domain ID (identifier), or an IP address). This switch identifier identifies the member switch in fabric switch 100. The fabric label can be included in a header of packet for any inter-fabric and/or intra-fabric communication.

Switches in network 100 use edge ports to communicate with end devices (e.g., non-member switches) and inter-switch ports to communicate with other member switches. For example, switch 102 is coupled to end device 112 via an edge port and to switches 101, 103, 104, and 105 via inter-switch ports and one or more links. Data communication via an edge port can be based on Ethernet and via an inter-switch port can be based on an encapsulation protocol (e.g., VXLAN or TRILL). It should be noted that control message exchange via inter-switch ports can be based on a different protocol (e.g., the IP or FC protocol).

A switch, such as switch 102, stores configuration information needed to operate switch 102 as an individual switch or as a member switch of fabric switch 100. Furthermore, switch 102 can participate in various services and operations, such as multicast communication. When switch 102 reboots (e.g., due to a failure) or is a replacement of a switch with similar configurations, switch 102 recovers and rebuilds its multicast states. As a result, until these states are converged, switch 102 cannot start forwarding multicast packets. For example, if end device 112 is a receiver of a multicast group, switch 102 can only forward the multicast data of the group to end device 112 after the convergence of the multicast states.

With existing technologies, to reduce the recovery time, switch 102 can use a static source and multicast group configuration. However, this approach requires statically provided prior knowledge of the sources and receivers (e.g., end device 112). As a result, this approach reduces the flexibility of the multicast protocol and affects the dynamic nature of the multicast protocol. Switch 102 can also send out an increased number of control messages for quickly detecting neighbors and topology changes. However, increasing the number of control messages leads to an increase of bandwidth consumption on the adjacent links coupling switches 101, 103, 104, and 105. In addition, these switches use a larger share of their processing capabilities for processing the additional control messages.

To solve this problem, switch 102 can be equipped with a fast multicast recovery framework 120. During operation, framework 120 obtains multicast state information from the local MCACHE. This information includes multicast soft states, which reside in the memory of the switch and not the hardware modules, the outgoing interface (OIF) tree (e.g., representing a list of OIFs) of a multicast group, and the hardware states. Framework 120 extracts the soft states for a respective multicast group from the MCACHE and represents the OIF information in an efficient representation. In one embodiments, this efficient representation includes serialization of the OIF information. Framework 102 then stores this efficient representation in a recovery file in a local persistent storage device (e.g., a flash drive). If switch 102 reboots (e.g., due to a failure), framework 102 retrieves the recovery file from the persistent storage device and restores the multicast states from the recovery file. This provides fully-constructed multicast trees for the multicast groups to switch 102. As a result, switch 102 can readily start forwarding multicast traffic when the underlying unicast protocol converges.

Fast Multicast Recovery Framework

Figure 1B:
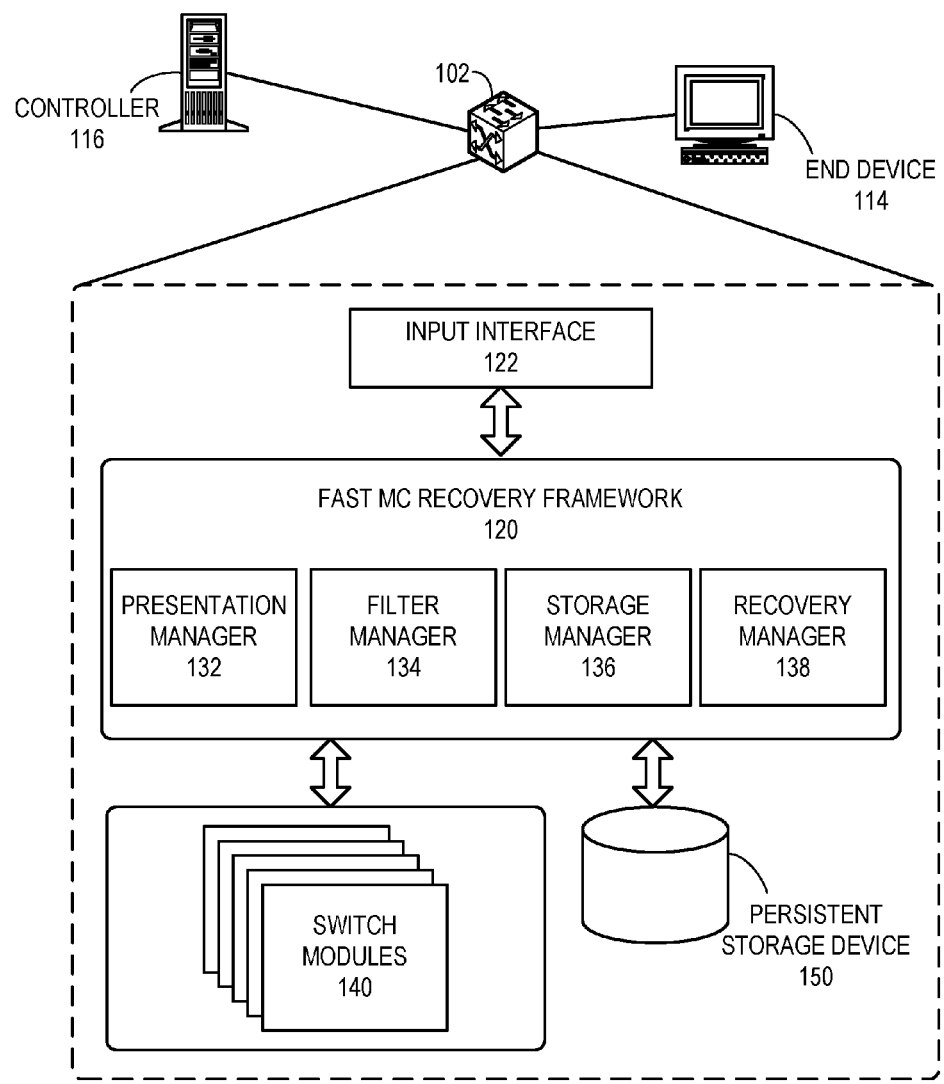
FIG. 1B illustrates an exemplary fast multicast recovery framework in a switch, in accordance with an embodiment of the present invention.

FIG. 1B illustrates an exemplary fast multicast recovery framework in a switch, in accordance with an embodiment of the present invention. In this example, switch 102 is equipped with an input interface 122 (e.g., a graphical user interface (GUI) and/or a command line interface (CLI). A user can access input interface 122 via end device 114. The user can obtain information from and provide instruction to switch 102 via input interface 122. The user can provide configurations associated with the fast multicast recovery process to switch 102 via input interface 122. For example, input interface 122 allows the user to configure the fast multicast recovery for a respective virtual routing and forwarding (VRF) of the global forwarding information of switch 102.

In some embodiments, the user can setup a filter using input interface 122. A filter selects a subset of the multicast groups in the MCACHE of switch 102. Framework 120 can store the states of the multicast groups determined based on the filter. The filter can be an access control list specifying one or more of: a range of multicast addresses, one or more RPs, and one or more incoming interfaces (IIFs). It should be noted that the filter is for selecting a subset of the MCACHE entries. If switch 102 is capable, switch 102 may not apply the filter and store a respective MCACHE entry in a recovery file. In addition, input interface 122 can also allow the user to configure one or more trigger events. A trigger event causes framework 120 to generate or update a recovery file. A trigger event can specify how frequently framework 120 generates a recovery file. The frequency of the backup process can be referred to as the backup frequency. As a result, switch 102 backs up multicast state information of only the multicast groups determined by the filter at the backup frequency. The trigger event can also be an update event. Framework 120 then updates a recovery file if an entry selected by the filter is updated (e.g., added, deleted, or modified) in the MCACHE.

During operation, when the multicast protocol running on switch 102 converges, switch 102 can retrieve its multicast states. The multicast states comprise PIM MCACHE states. A presentation manager 132 of framework 120 then obtain the soft states of a respective MCACHE entry and represents these states in an efficient representation. A storage manager 136 of framework 120 stores the information in a recovery file in a persistent storage device 150 (e.g., a flash memory card, a solid state drive, a hard drive, etc) of switch 102.

In some embodiments, the information in recovery files are stored as database tables in a relational database. Storage manager 136 can update the recovery file in response to detecting a trigger event. A filter manager 134 can apply the filter to select the set of multicast groups for which the switch facilitates the fast multicast recovery. Presentation manager 132 then obtains the entries for these multicast groups from the MCACHE. Storage manager 136 can update the recovery file in response to detecting a trigger event.

If switch 102 reboots (e.g., due to a failure), a recovery manager 138 retrieves the soft states from the recovery file stored in persistent storage device 150. Recovery manager 138 determines the incoming and outgoing ports of the multicast group and allocates the corresponding forwarding entries in the MCACHE. Recovery manager 138 also loads the forwarding information in switch modules 140. In some embodiments, switch modules 140 are hardware-based forwarding modules, such as ASIC chips and CAM. Multicast states loaded in switch modules 140 can be referred to as the hardware states. With a fully constructed multicast forwarding information pre-loaded in switch modules 140, switch 102 can start forwarding multicast traffic once the underlying unicast protocol converges.

In some embodiments, the fast multicast recovery process is executed by a network controller 116. Network 100 can be a software-defined network and switch 102 can forward traffic based on flow definitions received from controller 116. A flow definition can specify one or more of: an input port, an output port, and identifying information of a flow. A flow can be identified by one or more of: layer-2 and layer-3 source and destination addresses, port identifiers, and transport layer port (e.g., socket) information. Controller 116 can have a global view of a network. As a result, controller 116 can efficiently calculate the routes between sources and receivers, and build an efficient distribution tree for a multicast group. Controller 116 can send the information associated with this tree to switch 102, which can directly load the multicast states to switch modules 140. As a result, switch 102 can readily start forwarding multicast traffic. Framework 120 can continue to store multicast soft states in recovery files in storage device 150. This enables the use of centralized route calculation in a distributed network while retaining the robustness of the distributed multicast protocol.

Recovery Files

Figure 2:
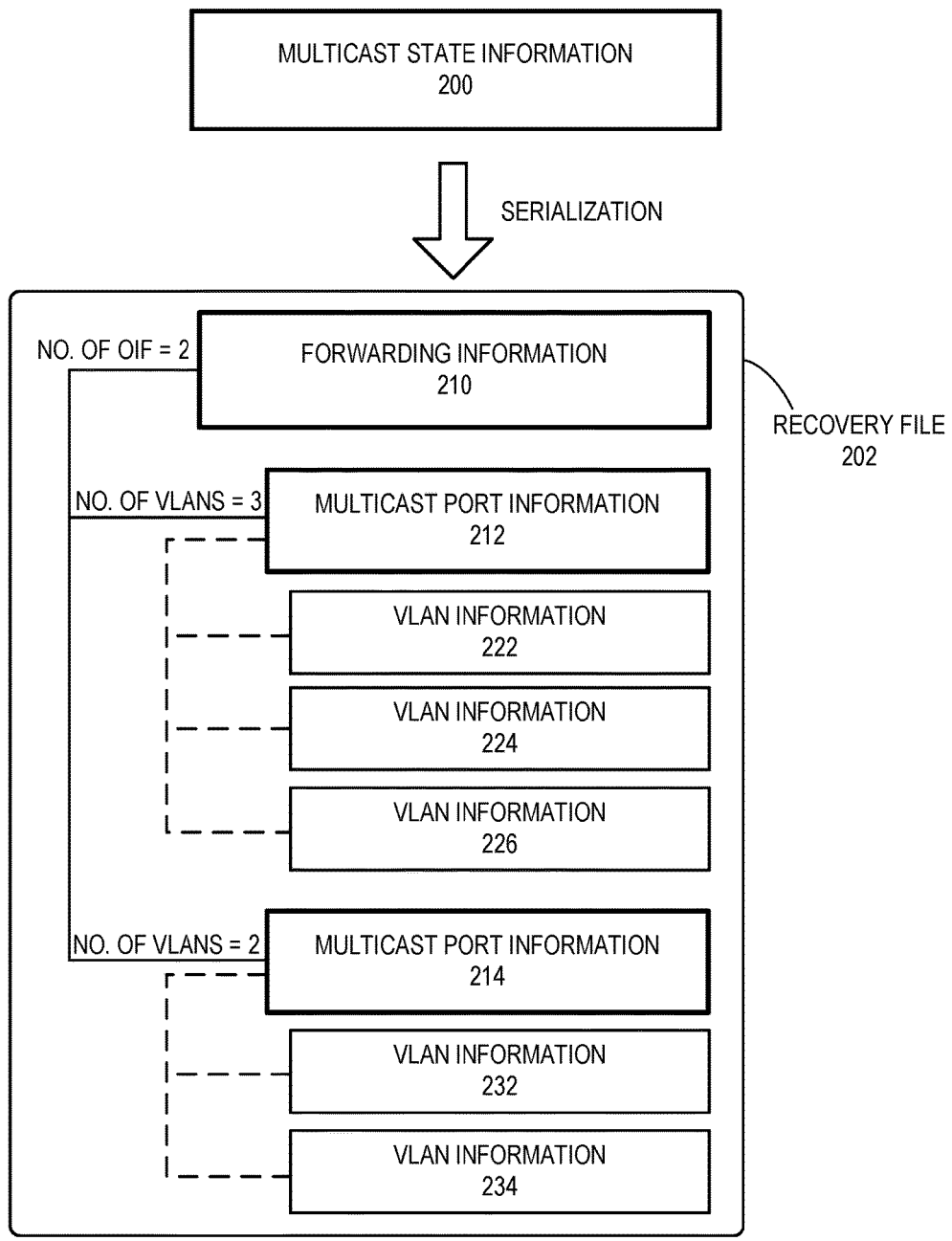
FIG. 2 illustrates an exemplary representation of multicast states in a recovery file, in accordance with an embodiment of the present invention.

FIG. 2 illustrates an exemplary representation of multicast states in a recovery file, in accordance with an embodiment of the present invention. In this example, multicast state information 200 of a switch is stored in a recovery file 202. Generation of recovery file 202 includes extraction of the soft states from the MCACHE and information associated with all outgoing interfaces for each of the MCACHE entries. The multicast states can be recovered from the information in recovery file 202. Information in recovery file 202 includes forwarding information, outgoing port information, and outgoing VLAN information.

Forwarding information 210 of recovery file 202 includes one or more fields representing the multicast forwarding entries. These fields represent the soft state of a respective forwarding entry in MCACHE. In some embodiments, forwarding information 210 is represented in a program update information format (e.g., a UPD format). This format can be a text format and include program-specific details of application updates. It should be note that the fields which represent the hardware state of the switch are allocated when a recovering switch boots up. The fields representing a multicast entry in forwarding information 210 include one or more of: source and group identifiers, protocol state flags for the entry, incoming port information, RP and upstream information, and an outgoing port count.

The source and group identifiers include one or more of: a source identifier of a multicast group, a multicast group identifier, and the size (or length) of the multicast group. The protocol state flags include one or more of: a shortest-path tree (SPT) flag, a rendezvous-point tree (RPT) flag, and a registering flag. The incoming port information includes one or more of: an identifier of an upstream switch (e.g., an IP address of the parent switch in the multicast tree), the incoming port identifier coupling the upstream switch, and a source VLAN identifier. The RP and upstream information includes one or more of: an RP address, a gateway identifier, and a layer-2 upstream switch identifier. The outgoing port count indicates the number of OIFs via which the data of the multicast group is forwarded. This number indicates the number of ports for which forwarding information 210 maintains incoming port information.

In addition to the soft states in forwarding information 210, recovery file 202 includes an OIF tree. This OIF tree can be based on the efficient representation of information. The number of nodes of the OIF tree corresponds to the outgoing port count. The OIF tree represents information for a respective OIF associated with forwarding information 210. For example, if the number of OIFs is two, recovery file 202 includes an OIF tree with multicast port information 212 and 214 representing the two OIFs, respectively. In other words, multicast port information 212 and 214 are the two nodes of the OIF tree.

Each of multicast port information 212 and 214 includes one or more fields representing the OIF port information. The fields in multicast port information 212 or 214 include one or more of: a VRF index, a transmission port (e.g., a port sending data to a receiver) identifier, a forwarding port (e.g., a port sending data to a downstream switch) identifier, a VLAN count representing a number of VLANs configured for the OIF, and a number of sources for the OIF. If the OIF is in a trunked port, the transmission port identifier corresponds to the primary port of the trunk and the forwarding port identifier corresponds to the forwarding port of the trunk.

In some embodiments, the outgoing VLAN information for a respective OIF is represented in a self-balancing binary search tree (e.g., an AVL tree). The binary tree can optionally be a serialized tree. A node of the binary tree can be referred to as a VLAN node. The VLAN information can be stored in a node of the OIF tree (i.e., in the multicast port information). For each OIF, the number of VLAN nodes corresponds to the VLAN count of the OIF. For example, if the VLAN count in multicast port information 212 is three, multicast port information 212 is associated with VLAN information 222, 224, and 226, representing the three VLAN nodes, respectively. Similarly, if the VLAN count in multicast port information 214 is two, multicast port information 214 is associated with VLAN information 232 and 234 representing the two VLAN nodes, respectively.

Each of VLAN information 222, 224, 226, 232, and 234 includes one or more fields representing the VLANs configured for an OIF. The fields in the VLAN information include one or more of: a VLAN identifier, an outgoing interface type, and outgoing interface state flags. Examples of an outgoing interface type include, but are not limited to, a layer-2 interface, a layer-3 interface, and a tunnel. Outgoing interface state flags include one or more of: inherited and intermediate flags.

Backup and Recovery

Figure 3A:
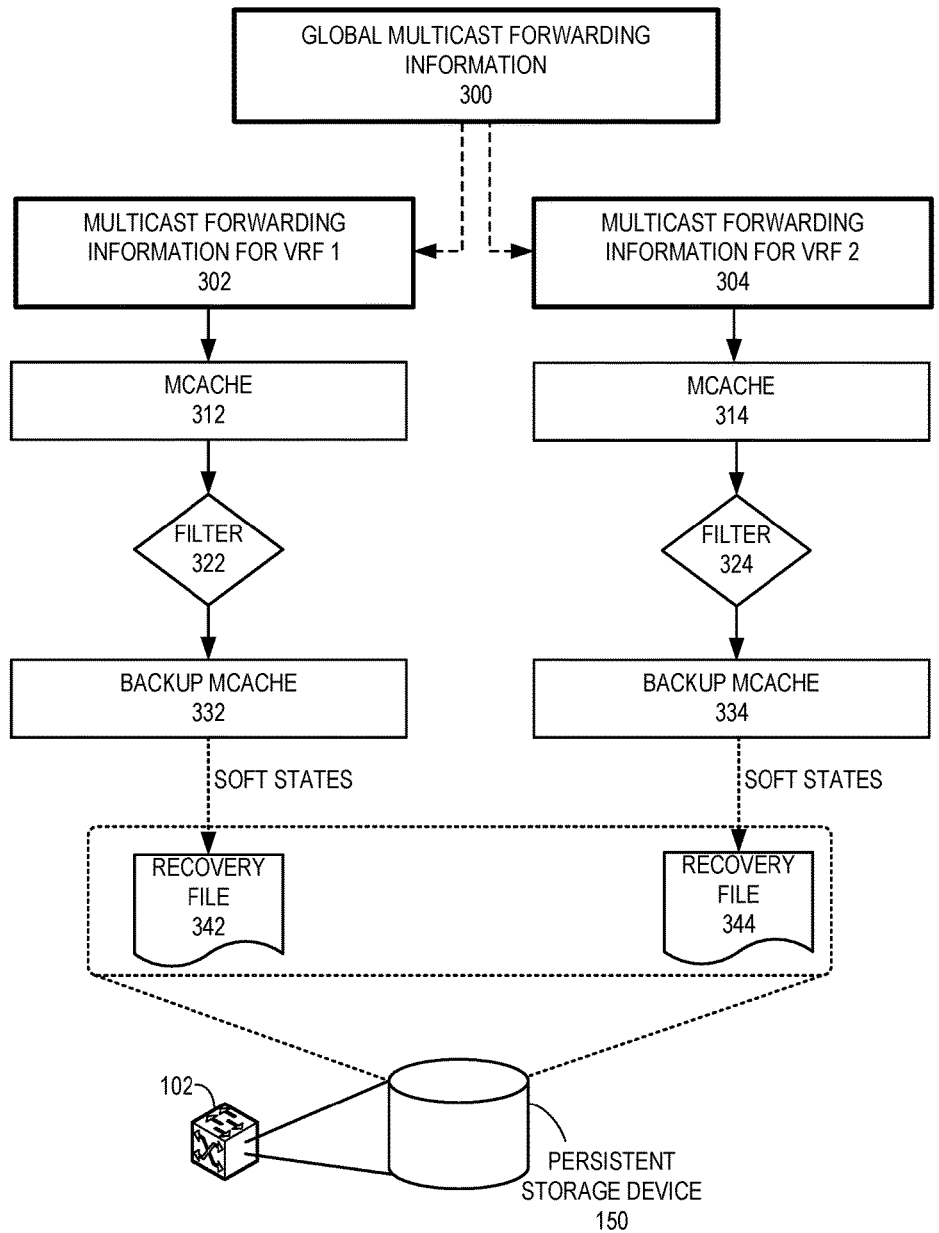
FIG. 3A illustrates an exemplary generation of recovery files for fast multicast recovery, in accordance with an embodiment of the present invention.

FIG. 3A illustrates an exemplary generation of recovery files for fast multicast recovery, in accordance with an embodiment of the present invention. In this example, switch 102 generates a recovery file for a respective VRF of switch 102. Suppose that switch 102 includes two VRFs 1 and 2. Switch 102 then obtains multicast forwarding information 302 and 304 representing VRFs 1 and 2, respectively. Switch 102 can retrieve multicast forwarding information 302 and 304 from global multicast forwarding information 300. The forwarding entries associated with multicast forwarding information 302 and 304 are stored in MCACHEs 312 and 314, respectively.

During operation, switch 102 takes a respective snapshot of MCACHEs 312 and 314 to ensure fast multicast convergence. If switch 102 has a large number of entries in MCACHEs 312 and 314, taking snapshots of MCACHEs 312 and 314 can take up more time. However, all entries in MCACHEs 312 and 314 may not be critical for the convergence of the multicast states after switch 102 reboots. To reduce the time needed to take the snapshots, the user can select a subset of the entries.

During operation, switch 102 applies filters 322 and 324 to MCACHEs 312 and 314, respectively. Applying filters 322 and 324 selects respective subsets of multicast groups (i.e., subset of the entries) from MCACHEs 312 and 314. Filters 322 and 324 can be access control lists specifying one or more of: a range of multicast addresses, one or more RP, and one or more incoming interfaces. In some embodiments, entries associated with the multicast groups selected by applying filters 322 and 324 are stored in backup MCACHE data structures 332 and 334, respectively. A user can define a single filter, which can be applied to both MCACHEs 312 and 314 (e.g., filters 322 and 324 can be the same). A user can also define a filter for a respective VRF (e.g., filters 322 and 324 are defined per VRF).

In addition, based on one or more trigger events, switch 102 generates recovery files 342 and 344 by extracting soft states from backup MCACHEs 342 and 344, respectively. A trigger event can specify a backup frequency or an update event. Trigger events for backup MCACHEs 342 and 344 can be the same or different. To take the snapshots, switch 102 traverses the entries in backup MCACHEs 342 and 344 instead of MCACHEs 312 and 314. In this way, switch 102 backs up only the entries selected by filters 322 and 324, respectively, thereby reducing the time taken to take the snapshots. Upon generation of recovery files 342 and 344, switch 102 stores them in its persistent storage device 150.

Figure 3B:
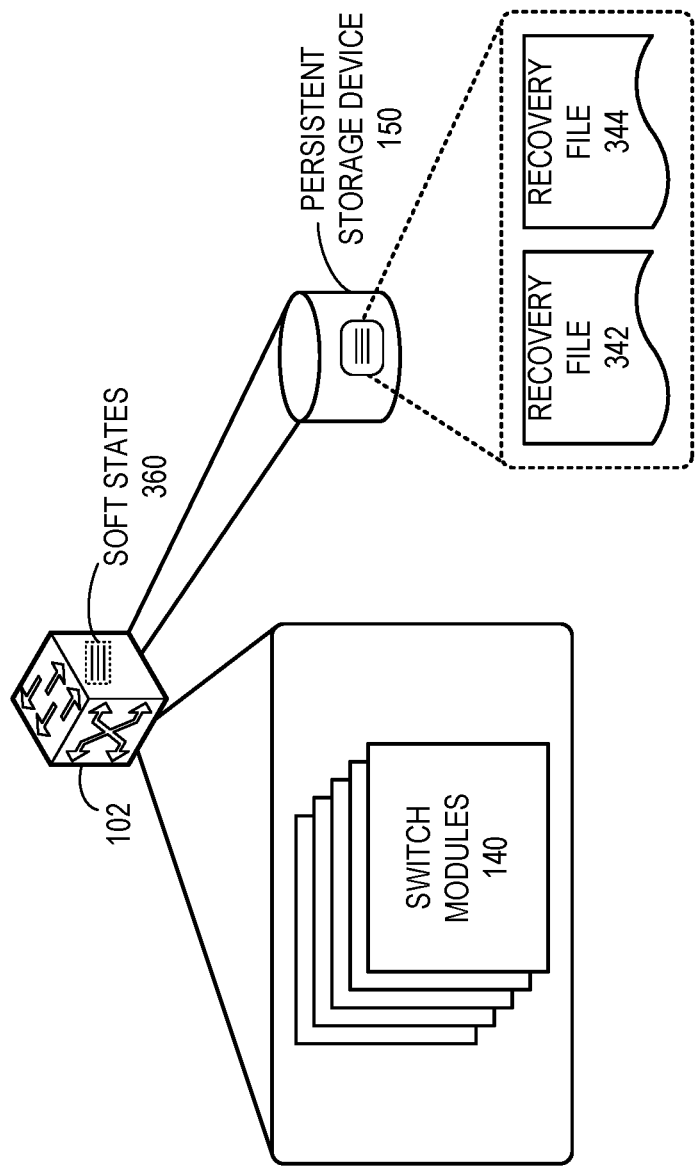
FIG. 3B illustrates an exemplary fast multicast recovery based on recovery files in a persistent storage device of a switch, in accordance with an embodiment of the present invention.

FIG. 3B illustrates an exemplary fast multicast recovery based on recovery files in a persistent storage device of a switch, in accordance with an embodiment of the present invention. If switch 102 reboots, the multicast states are restored based on the fast multicast recovery process. Switch 102 reads from persistent storage device 150 to obtain recovery files 342 and 344. Switch 102 then builds an OIF tree for a respective VRF and generates corresponding forwarding entries in the local MCACHE (e.g., MCACHEs 312 and 314 in FIG. 3A). Switch 102 then populates soft states 360 for each MCACHE entry, such as the IIF, OIF, and VLAN information, based on the data from recovery files 342 and 344.

Switch 102 then loads the multicast forwarding entries to switch modules 140. These forwarding entries specify the OIFs for a multicast packet. Switch 102 also allocates its hardware resources for each entry. Switch 102 initiates a timer for a respective OIF and a keep-alive timer for a respective entry. This ensures that the entry adjusts to any changes in the topology occurred during the boot up process. Since these hardware resources are configured before the a port becomes operational, the entries in switch modules 140 starts forwarding when a corresponding port becomes operational (e.g., when the underlying unicast protocol converges).

Backup and Recovery Operations

Figure 4A:
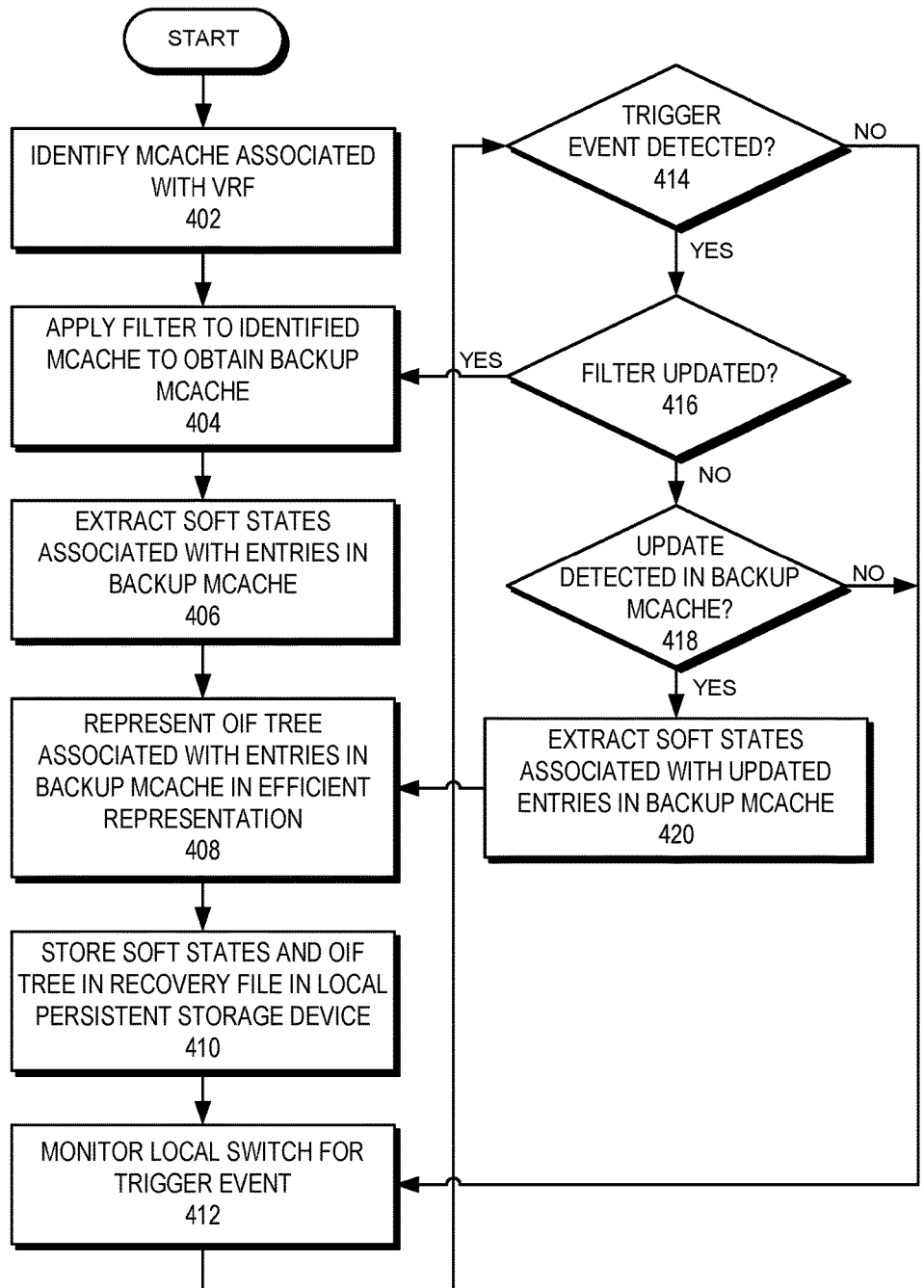
FIG. 4A presents a flowchart illustrating an exemplary process of a switch generating recovery files and storing in a persistent storage device, in accordance with an embodiment of the present invention.

FIG. 4A presents a flowchart illustrating an exemplary process of a switch generating recovery files and storing in a persistent storage device, in accordance with an embodiment of the present invention. During operation, the switch identifies an MCACHE associated with a VRF (operation 402) and applies a filter to the identified MCACHE to obtain a backup MCACHE (operation 404). The switch extracts the soft states associated with the entries in the backup MCACHE (operation 406) and represents the OIF tree associated with the entries in the backup MCACHE in an efficient representation (operation 408). The efficient representation can include outgoing port information and outgoing VLAN information.

The switch stores the soft states and the OIF tree in a recovery file in the local persistent storage device (operation 410) and monitors the local switch for a trigger event (operation 412). Examples of a trigger event include, but are not limited to, a periodic check and an update to an entry (e.g., addition, deletion, or modification). The switch checks whether the switch has detected a trigger event (operation 414). If the switch has detected a trigger event, the switch checks whether the filter has been updated (operation 416). If the filter has been updated, the switch applies the updated filter to the MCACHE to re-obtain the backup MCACHE (operation 404) and extracts the soft states associated with the entries in the backup MCACHE (operation 406).

If the filter has not been updated, the switch checks whether the switch has detected an update in the backup MCACHE (operation 418). If the switch has detected an update in the backup MCACHE, the switch extracts the soft states associated with the updated entries in the backup MCACHE (operation 420) and represents the OIF tree associated with the entries in the backup MCACHE in an efficient representation (operation 408). If the switch has not detected a trigger event (operation 414) or an update in the backup MCACHE (operation 418), the switch continues to monitor the local switch for a trigger event (operation 412) and check whether the switch has detected a trigger event (operation 414).

Figure 4B:
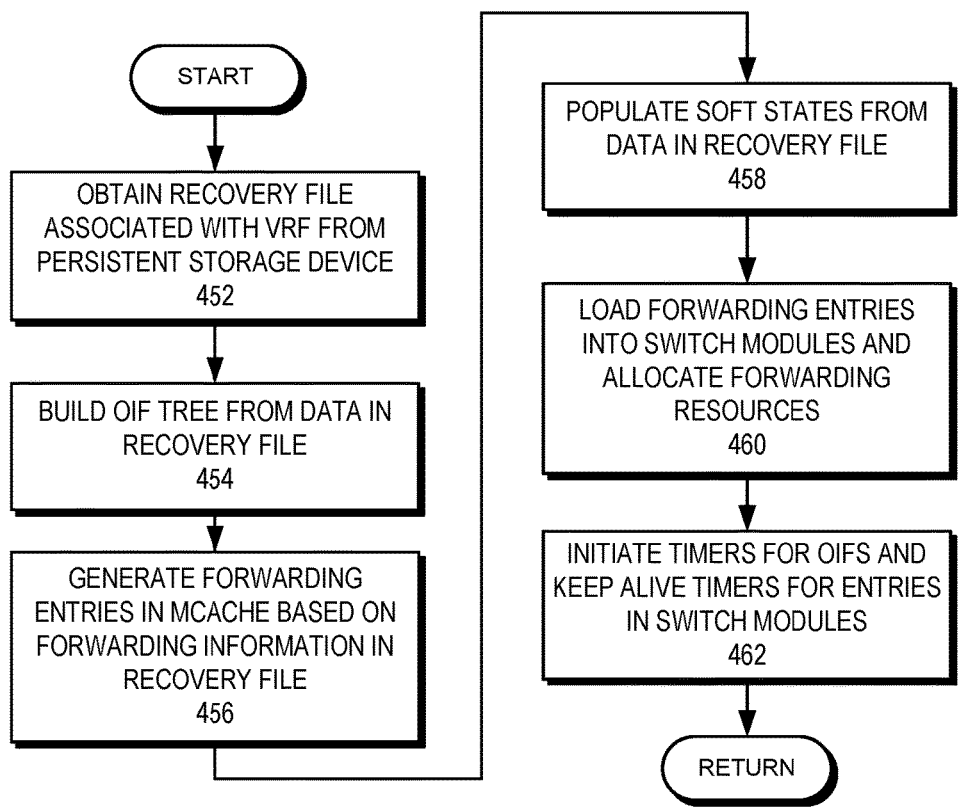
FIG. 4B presents a flowchart illustrating an exemplary fast multicast recovery process of a switch based on recovery files in a persistent storage device, in accordance with an embodiment of the present invention.

FIG. 4B presents a flowchart illustrating an exemplary fast multicast recovery process of a switch based on recovery files in a persistent storage device, in accordance with an embodiment of the present invention. During operation, the switch obtains a recovery file associated with a VRF from the local persistent storage device (operation 452) and builds an OIF tree from the data in the recovery file (operation 454). The switch then generates the forwarding entries in the MCACHE based on the forwarding information in the recovery file (operation 456). The switch populates the soft states from the data in the recovery file (operation 458). The soft states includes one or more of: IIF, OIF, and VLAN information. The switch then loads the forwarding entries into the switch modules and allocates the forwarding resources (operation 460). The switch also initiates timers for the OIFs and keep alive timers for the entries in the switch modules (operation 462).

Exemplary Switch

Figure 5:
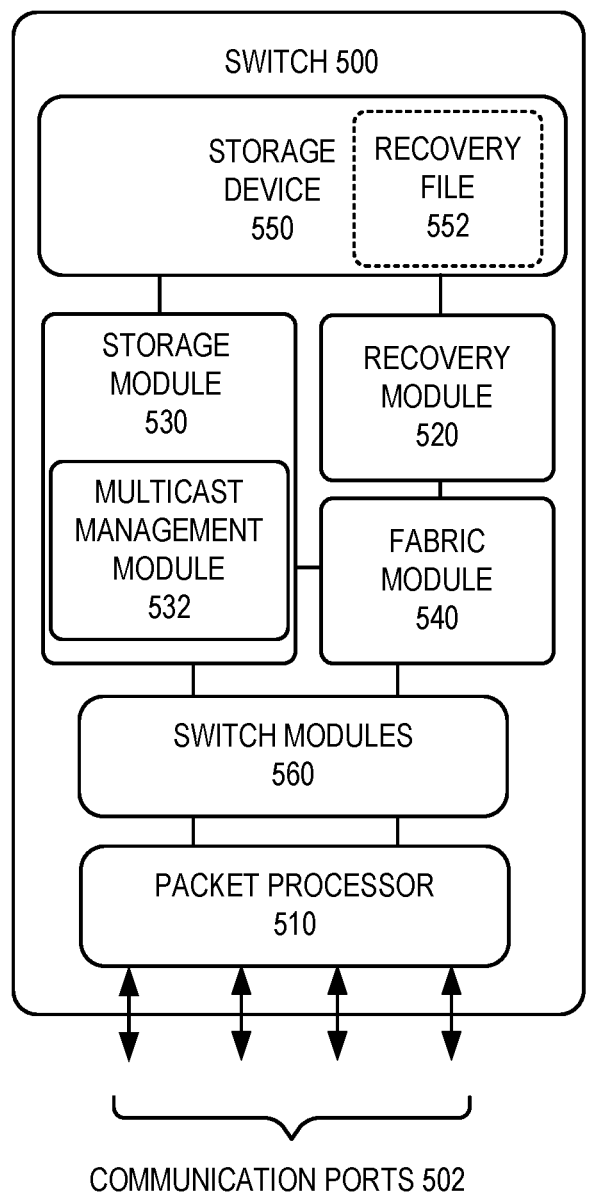
FIG. 5 illustrates an exemplary switch with fast multicast recovery framework support, in accordance with an embodiment of the present invention.

FIG. 5 illustrates an exemplary switch with fast multicast recovery framework support, in accordance with an embodiment of the present invention. In this example, a switch 500 includes a number of communication ports 502, a packet processor 510, a storage module 530, a multicast management module 532, a recovery module 520, and a persistent storage device 550. Switch 500 can also include switch modules 560 (e.g., processing hardware of switch 500, such as its ASIC chips), which includes information based on which switch 500 processes packets (e.g., determines output ports for packets). Packet processor 510 extracts and processes header information from the received frames. Packet processor 510 can identify a switch identifier associated with the switch in header of a packet.

In some embodiments, switch 500 maintains a membership in a fabric switch, as described in conjunction with FIG. 1, wherein switch 500 also includes a fabric switch module 540. Fabric switch module 540 maintains a configuration database in storage device 540 that maintains the configuration state of every switch within the fabric switch. Fabric switch module 540 maintains the state of the fabric switch, which is used to join other switches. In some embodiments, switch 500 can be configured to operate in conjunction with a remote switch as an Ethernet switch.

Communication ports 502 can include inter-switch communication channels for communication within the fabric switch. This inter-switch communication channel can be implemented via a regular communication port and based on any open or proprietary format. Communication ports 502 can also include one or more extension communication ports for communication between neighbor fabric switches. Communication ports 502 can include one or more TRILL ports capable of receiving frames encapsulated in a TRILL header. Communication ports 502 can also include one or more IP ports capable of receiving IP packets. An IP port is capable of receiving an IP packet and can be configured with an IP address. Packet processor 510 can process TRILL-encapsulated frames and/or IP packets (e.g., tunnel encapsulated packets).

During operation, multicast management module 532 represents multicast information from one or more entries of a multicast data structure in a way that switch 500 can derive its multicast states from the multicast information. This representation can include serialization of the multicast information. Storage module 530 stores the multicast information in a recovery file 552 in storage device 550. If switch 500 reboots, recovery module 520 restores the multicast states of switch 500 from the multicast information in recovery file 552. Storage module 530 updates recovery file 552 in response to detecting a trigger event. In some embodiments, the multicast data structure is a backup MCACHE obtained by applying a filter to the MCACHE of switch 500. Multicast management module 532 can maintain a backup MCACHE for a respective VRF of the global forwarding information of switch 500.

Note that the above-mentioned modules can be implemented in hardware as well as in software. In one embodiment, these modules can be embodied in computer-executable instructions stored in a memory which is coupled to one or more processors in switch 500. When executed, these instructions cause the processor(s) to perform the aforementioned functions.

In summary, embodiments of the present invention provide a switch and a method which provide fast multicast recovery for the switch. In one embodiment, the switch includes a multicast management module, a storage module, and a recovery module. During operation, the multicast management module represents multicast information from one or more entries of a multicast data structure in a way that the switch can derive its multicast states from the multicast information. The storage module stores the serialized multicast information in a recovery file in a local persistent storage device. If the switch reboots, the recovery module restores the multicast states of the switch from the multicast information in the recovery file.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   multicast circuitry configured to represent multicast information from one or more entries of a multicast data structure in a way that multicast states of the switch are derivable from the multicast information;
   storage circuitry configured to store the multicast information in a recovery file in a local persistent storage device; and
   recovery circuitry configured to, in response to detecting the switch rebooting, restore the multicast states of the switch from the multicast information in the recovery file and initiate one of more of:
      a timer for a respective outgoing interface of an outgoing interface tree associated with an entry of a local multicast cache (MCACHE); and
      a keep-alive timer for multicast forwarding information in forwarding hardware of the switch.

2. The switch of claim 1, wherein representing the multicast information includes one or more of:
   serializing an outgoing interface tree associated with a respective entry of the multicast data structure; and
   serializing virtual local area network (VLAN) information configured for a respective outgoing interface of the outgoing interface tree.

3. The switch of claim 1, wherein the multicast data structure is a backup MCACHE, and wherein the one or more entries in the multicast data structure is selected by applying a filter to the local MCACHE.

4. The switch of claim 3, wherein the filter is an access control list specifying one or more of: a range of multicast addresses, one or more rendezvous points (RPs), and one or more incoming interfaces.

5. The switch of claim 3, wherein the multicast management circuitry is further configured to maintain a backup MCACHE for a respective virtual routing and forwarding (VRF) of the global forwarding information of the switch.

6. The switch of claim 1, wherein the storage circuitry is further configured to update the recovery file in response to detecting a trigger event, wherein the trigger event is based on one or more of: an update frequency and a detection of an update to the multicast states of the switch.

7. The switch of claim 1, wherein restoring the multicast states of the switch includes one or more of:
  generating multicast forwarding entries in the local MCACHE;
  populating an outgoing interface tree for a respective entry of the local MCACHE; and
  loading multicast forwarding information into switch hardware.

8. A method, comprising:
  representing multicast information from one or more entries of a multicast data structure of a switch in a way that multicast states of the switch are derivable from the multicast information;
  storing the multicast information in a recovery file in a local persistent storage device of the switch; and
  in response to detecting the switch rebooting, restoring the multicast states of the switch from the multicast information in the recovery file and initiating one of more of:
    a timer for a respective outgoing interface of an outgoing interface tree associated with an entry of a local multicast cache (MCACHE); and
    a keep-alive timer for multicast forwarding information in forwarding hardware of the switch.

9. The method of claim 8, wherein serializing the multicast information includes one or more of:
  serializing an outgoing interface tree associated with a respective entry of the multicast data structure; and
  serializing virtual local area network (VLAN) information configured for a respective outgoing interface of the outgoing interface tree.

10. The method of claim 8, wherein the multicast data structure is a backup MCACHE, and wherein the one or more entries in the multicast data structure is selected by applying a filter to the local MCACHE.

11. The method of claim 10, wherein the filter is an access control list specifying one or more of: a range of multicast addresses, one or more rendezvous points (RPs), and one or more incoming interfaces.

12. The method of claim 10, further comprising maintaining a backup MCACHE for a respective virtual routing and forwarding (VRF) of the global forwarding information of the switch.

13. The method of claim 8, further comprising updating the recovery file in response to detecting a trigger event, wherein the trigger event is based on one or more of: an update frequency and a detection of an update to the multicast states of the switch.

14. The method of claim 8, wherein restoring the multicast states of the switch includes one or more of:
  generating multicast forwarding entries in the local MCACHE;
  populating an outgoing interface tree for a respective entry of the local MCACHE; and
  loading multicast forwarding information into switch hardware.

15. A computer system; comprising:
  a processor;
  a storage device coupled to the processor and storing instructions that when executed by the processor cause the processor to perform a method, the method comprising:
  representing multicast information from one or more entries of a multicast data structure of a switch in a way that multicast states of the switch are derivable from the multicast information;
  storing the multicast information in a recovery file in a local persistent storage device of the switch; and
  in response to detecting the switch rebooting, restoring the multicast states of the switch from the multicast information in the recovery file and initiating one of more of:
    a timer for a respective outgoing interface of an outgoing interface tree associated with an entry of a local multicast cache (MCACHE); and
    a keep-alive timer for multicast forwarding information in forwarding hardware of the switch.

16. The computer system of claim 15, the multicast data structure is a backup MCACHE, and wherein the one or more entries in the multicast data structure is selected by applying a filter to the local MCACHE.

17. The computer system of claim 15, wherein the method further comprises updating the recovery file in response to detecting a trigger event, wherein the trigger event is based on one or more of: an update frequency and a detection of an update to the multicast states of the switch.

18. The computer system of claim 15, wherein restoring the multicast states of the switch includes one or more of:
  generating multicast forwarding entries in the local MCACHE;
  populating an outgoing interface tree for a respective entry of the local MCACHE; and
  loading multicast forwarding information into switch hardware.

19. The switch of claim 1, wherein the multicast data structure and the local MCACHE reside in a memory of the switch.

20. The method of claim 8, wherein the multicast data structure and the local MCACHE reside in a memory of the switch.

* * * * *